Patented Aug. 7, 1934

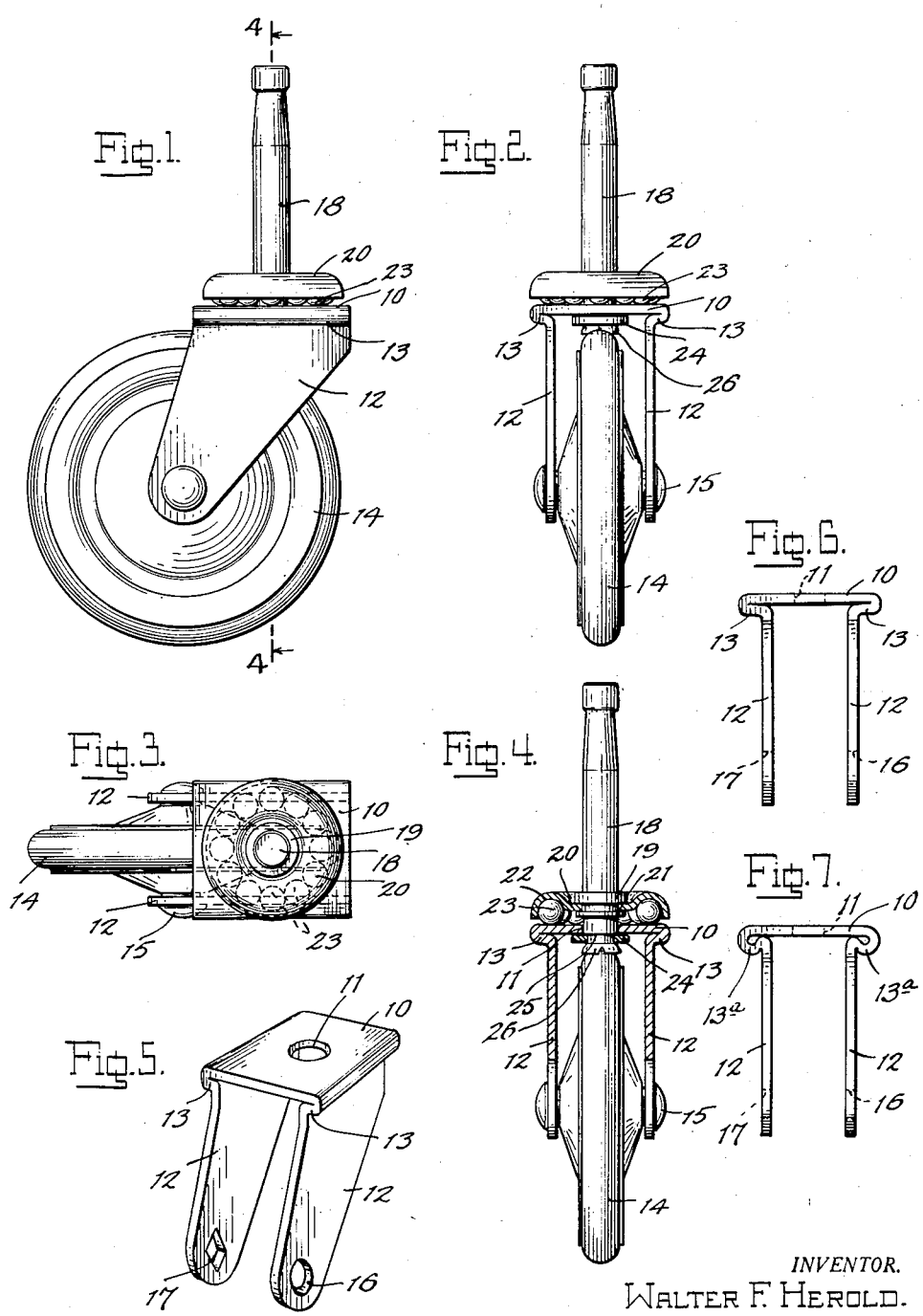

1,969,557

UNITED STATES PATENT OFFICE 1,969,557

BALL-BEARING CASTER

Walter F. Herold, Bridgeport, Conn., assignor to The Bassick Company, Bridgeport, Conn., a corporation of Connecticut Application April 22, 1933, Serial No. 667,385

2 Claims. (Cl. 16—31)

The present invention relates to ball-bearing casters and has for an object to provide a caster of this character of very simple and economical construction, and in which the top of the caster horn is utilized as the lower ball-race surface of the ball bearing means, to the end that a simpler and more compact structure is provided, and the necessity for providing a separate lower ball-race member is done away with. Heretofore it has been necessary in ball-bearing casters, in which the horn was relatively narrow and a relatively larger diameter ball bearing means was desired, to provide a separate ball-race member of sufficient width to accommodate the balls. It is proposed in the present invention to provide a caster in which the horn sides may be relatively narrow, and in which an integral horn top is provided of sufficient width to provide a relatively wide lower ball-race surface for the ball-bearing means.

A further object is to provide a structure which will permit the same horn blank to be used for different width casters, while the horn top remains of a given width to provide the lower ball-race surface for a standard diameter ball-bearing means.

Another object is to provide a caster in which the horn sides will be reinforced at their points of connection with the horn top and in which the vertical pressure of the sides on the horn top will be applied at points inwardly of the outer edges of the horn top, so that a more substantial support is provided directly in line with the ball-bearing support, and the chance of bending or distortion is greatly reduced. The construction will thus provide better swiveling action, and because of the reinforcement and improved distribution of stresses will permit of lighter gauge metal being employed.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a side elevation of a ball bearing caster, according to the exemplary illustrated embodiment of the invention.

Fig. 2 is a front elevation thereof.

Fig. 3 is a top plan view.

Fig. 4 is a vertical sectional view taken along the line 4—4 of Fig. 1.

Fig. 5 is a perspective view of the horn employed.

Fig. 6 is a front elevation showing a horn, according to the invention, in which the horn-sides are of relatively narrower width than those of the horn shown in Figs. 1 to 5.

Fig. 7 is a front elevation of a caster horn, according to a modified form of the invention.

Similar reference characters indicate corresponding parts throughout the several figures of the drawing.

Referring to the drawing, the caster, according to the illustrated exemplary embodiment of the invention, comprises a horn bent from a sheet metal blank, having a rectangular top 10 provided with a central opening 11, and a pair of horn sides 12—12 inwardly offset from the side edges of the top by means of bent-under shoulders 13—13 folded upon the under surface of the top and from which the sides 12—12 extend downwardly in right angular relation. The horn top is of a width greater than the diameter of the ball-bearings, presently to be more fully referred to, and constitutes a lower ball-race surface therefor. The horn sides may be of any desired width, irrespective of the width of the horn top and the ball-bearing diameter, so that a proper and sufficient ball bearing diameter may be provided while the horn sides may be relatively narrow, and their distance apart may be varied without any change in the sheet metal blank. Fig. 6 for example shows a horn formed from the same blank as that shown in Figs. 1 to 5, but in which the horn sides 12—12 are closer together.

The caster wheel 14 is supported between the horn sides upon an axle 15 extending through a pair of bearing openings 16 and 17 in the lower ends of the horn sides.

The pintle 18 is provided near its lower end with a shoulder 19 against which the upper ball race cap member 20 is secured by swaging the lower end of the pintle upwardly against the under side of the cap member, as at 21. The cap member has an annular ball-race groove 22 formed therein, and a row of balls 23 is disposed within this groove and rests upon the horn top 10, the latter forming the lower ball-race.

The lower end of the pintle is rotatably engaged in the opening 11, and is assembled to the horn top by means of a washer 24 engaged upon the lower shouldered end 25 of the pintle secured by swaging the base of the pintle, as at 26.

It will be seen that the construction not only provides a lower ball-race integral with the horn top, while permitting the sides of the horn to be relatively narrow, but that the horn is greatly reinforced by the bent under shoulders 13—13 and the weight and stresses are more uniformly distributed to the ball bearing structure, the horn sides being substantially directly under the balls. The reinforcement furthermore provides a more rigid horn and the likelihood of bending and distortion is greatly reduced.

In Fig. 7 I have shown a modified form of caster horn, according to the invention, in which the bent under shoulders 13ª—13ª are curled beneath the horn top, as distinguished from the flat shoulders shown in Figs. 1 to 6, the upper ends of the horn sides 12—12 being engaged with the under side of the horn top so that the weight and stresses are distributed to the horn top and ball-bearing in a substantially similar manner to the other embodiments.

I have illustrated and described a preferred and satisfactory embodiment of the invention, but it will be obvious that changes may be made therein, within the spirit and scope thereof, as defined in the appended claims.

Having thus described my invention what I claim and desire to secure by Letters Patent is:—

1. In a ball-bearing caster, a sheet metal wheel supporting horn including a flat top having parallel side edges and a pair of sides integral therewith extending downwardly from the side edges of said top, ball-bearing means mounted upon said horn top comprising an upper ball-race member having an annular ball retaining recess, a series of balls disposed between said upper ball-race member and said flat horn top, said flat horn top constituting a lower ball-race surface, said horn sides being bent inwardly from the side edges of said horn top and downwardly from said inwardly bent portions, said last mentioned bend being in contact with the under side of the horn top substantially vertically aligned with the central line of rotation of said balls, the downwardly bent portions being vertical and parallel whereby the load imposed on said balls is directly transmitted to said downwardly bent portions.

2. In a ball-bearing caster, a sheet metal wheel supporting horn including a flat top having parallel side edges and a pair of sides integral therewith extending downwardly from the side edges of said top, ball-bearing means mounted upon said horn top comprising an upper ball-race member having an annular ball retaining recess, a series of balls disposed between said upper ball-race member and said flat horn top, said flat horn top constituting a lower ball-race surface, said horn sides being bent inwardly from the side edges of said horn top against the under surface of said horn top to constitute double thickness reinforcing portions and being bent downwardly from said inwardly bent portions at a point substantially vertically aligned with the central line of rotation of said balls, the downwardly bent portions being vertical and parallel whereby the load imposed on said balls is directly transmitted to said downwardly bent portions.

WALTER F. HEROLD.